Figure 1:
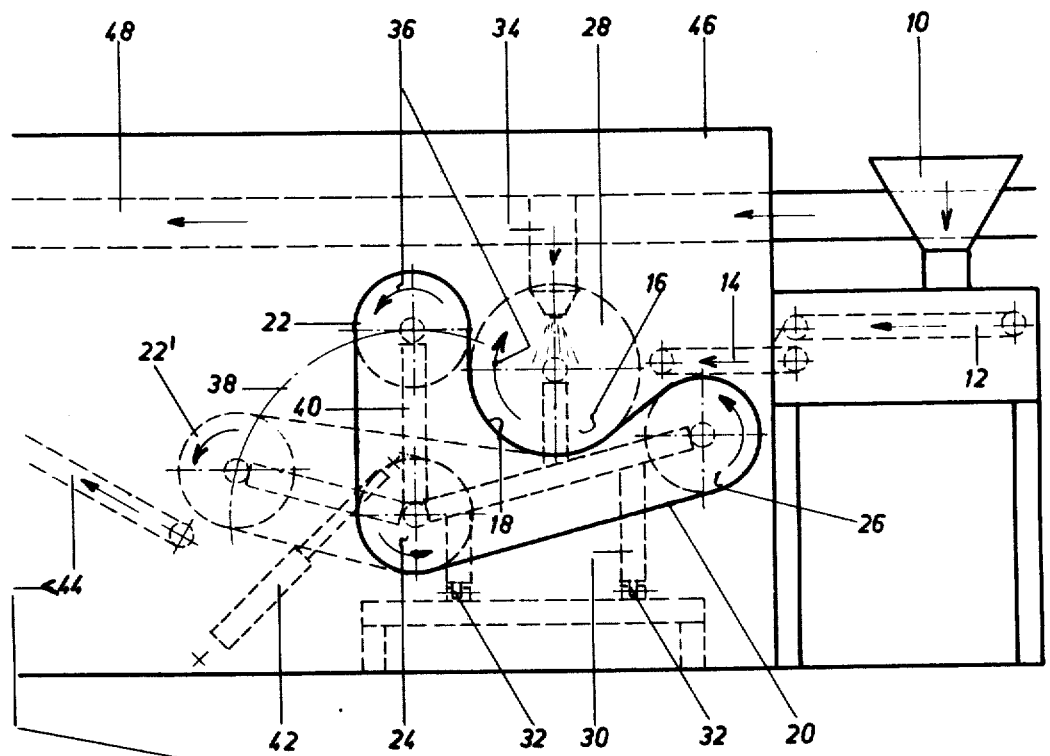
Figure 1:
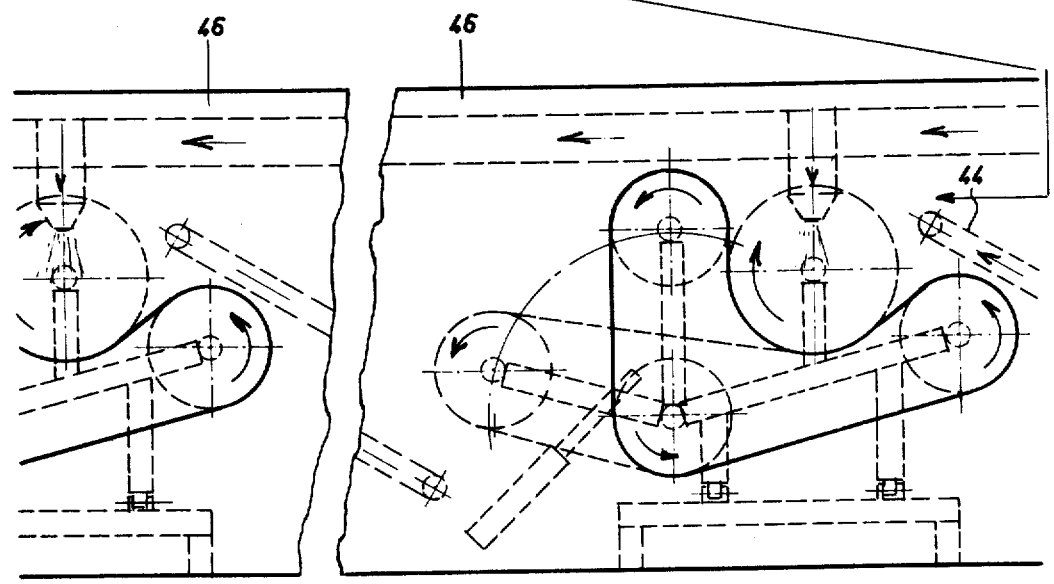

United States Patent [19]
Steinberg et al.

[11] 3,875,894
[45] Apr. 8, 1975

[54] APPARATUS FOR FULLY AUTOMATIC PRODUCTION OF DRAGEES

[75] Inventors: Gerhard Steinberg, Wasserburg, Germany; Heinz Mutze, Magliaso, Switzerland

[73] Assignee: Gerhard Steinberg S.A., Caslano, Switzerland

[22] Filed: Aug. 3, 1972

[21] Appl. No.: 277,824

[30] Foreign Application Priority Data
Aug. 5, 1971   Germany.............................. 2139154

[52] U.S. Cl. ........................ 118/19; 118/303; 259/2
[51] Int. Cl. .......................... B05c 5/00; B05c 11/12
[58] Field of Search ...... 118/19, 417, 303; 117/109; 259/2, 29; 198/206, 207

[56]       References Cited
       UNITED STATES PATENTS
446,247    2/1891    Carter............................ 118/303 X
2,308,420  1/1943    Hoopes............................ 118/19 X
3,063,843  11/1962   Hashimoto........................ 118/19 X
3,448,718  6/1969    Green et al...................... 118/19 X
3,734,471  5/1973    Engels............................ 118/303 X

*Primary Examiner*—John P. McIntosh
*Attorney, Agent, or Firm*—Waters, Roditi, Schwartz & Nissen

[57]                ABSTRACT

A method and apparatus for coating dragees with a coating suspension including conveying the cores of the dragees to a first loading station at which suspension is sprayed thereon, conveying the sprayed cores to a second unloading station at which the suspension is dried to form a coating of predetermined thickness, and conveying the dragees to a packing station. If necessary, a plurality of successive spraying and drying sequences may be utilized to form the dry coatings of required thickness and weight.

2 Claims, 4 Drawing Figures

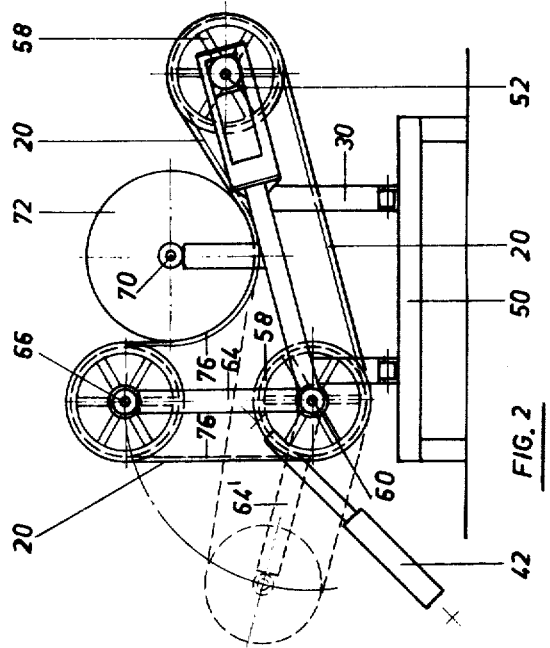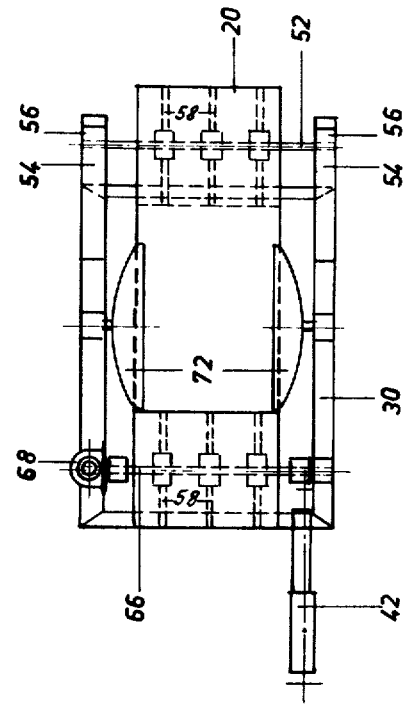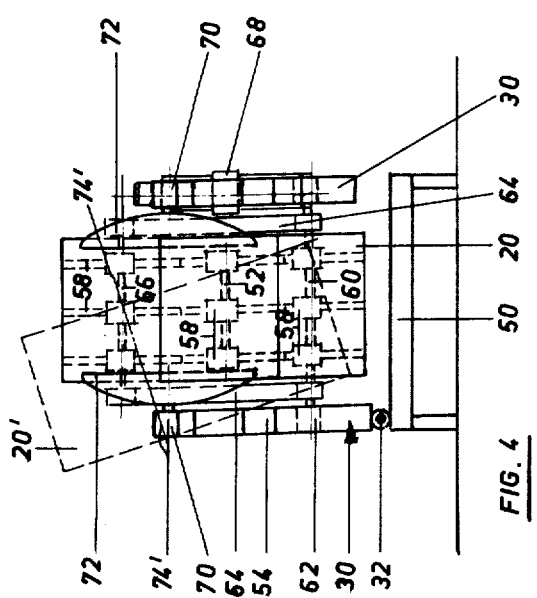

3,875,894

1

APPARATUS FOR FULLY AUTOMATIC PRODUCTION OF DRAGEES

The invention relates to an apparatus for fully automated production of dragees for the confectionery and pharmaceutical industries.

A coating machine for the production of dragees is known which comprises an endless grid band which runs over three parallel guiding drums arranged in contact with the inner surface of the grid band. The axes of the first and second of said drums are arranged on a substantially horizontal plane, while the third drum is arranged substantially above the second drum. Between the first and third guiding drums a pair of coaxial discs is arranged which touches the outer surface of the grid band so as to cause the grid band to bend downwards. Thus the grid band, when operated, runs along a closed path comprising a concave section at the periphery of said discs. In use, a plurality of cores carried by the grid band are coated in the period during which they run along said concave section of the band path. The cores are first sprayed with a coating suspension which is then dried to form a dry coat. Said spraying and drying stages may be repeated several times to achieve a coat of a given thickness. To discharge the dragees or coated cores from the grid band, the direction of travel of the band is reversed. The dragees are removed from the band at the changing point.

The above coating machine is not suitable for a fully automated production of dragees and can only be used for a definite load.

The object of the invention is to provide a fully automatic production of dragees.

The invention is based on the knowledge that in the case of a fully automated drageeing process the essential point is that the quality of cores, the amount of coating sprayed on per spraying stage in a given time, the drying times and the speed of movement of the cores to be coated during each spraying stage must be exactly defined and then held constant. If, as in the known drageeing apparatus, a single coating device is used, it is necessary to alter the conditions of movement, namely the drive speed of the drageeing apparatus and the drageeing angle, that is to say the angle at which the coating suspension impinges onto the cores to be coated for each spraying stage, since with each spraying stage the cores become heavier and larger in circumference. Thus, if several spraying stages are to take place one after the other in a single device, as was previously the case, then to achieve a satisfactory result the speed of movement of the cores and the drageeing angle have to be adjusted continuously. But this is only possible if the cores are constantly monitored during drageeing so that the adjustments can be made by hand depending on the conditions of movement. In a fully automated process this is impossible, particularly because the required adaptations cannot be predetermined but are dependent on the size and shape of the cores.

Since in accordance with the invention each spraying stage and corresponding dying stage takes place in a separate coating device, the dried cores then being carried to the following coating device where they undergo a further spraying stage with subsequent drying, it is possible to apply an exactly predetermined spray coating and since this quantity of spraying agent is constant for each spraying stage with respect to the individual coating device, the speeds of movement and drageeing angle for each device can be held constant for optimum conditions of movement of the cores.

Preferably, as set forth above, said plurality of cores is predetermined in number and weight, said weight being measured before coating.

According to another aspect of the present invention there is provided an apparatus for fully automated production of dragees according to the method as set forth above, the apparatus comprising on the one hand a loading station for cores to be coated and on the other hand a unloading station for the coated cores, at least one coating device for said cores between said loading and unloading station, a weighing device at said loading station to feed the coating device or the first of said coating devices with a predetermined quantity of cores to be coated, and a transfer device for the or each of said coating devices to transport the coated cores from said coating device to the following coating devices, if any or to the unloading station; the cores moving within the apparatus from said loading station to said unloading station without reversing their movement at any point on their path.

Preferably, in the apparatus as set forth in the preceding paragraph, the or each coating device comprises a support frame; at least three rotatable member on said frame, the axes of rotation of said rotatable members being substantially parallel to one another; an endless belt running round said rotatable members so as to form an upper run and a lower run; continuously regulable driving means to move said belt in one direction only; and spraying means and drying means to respectively form and set the coating of the cores; one of said rotatable members being arranged between the others and in contact with the outer surface of the upper run of the endless belt and said other rotatable members being arranged in contact with the inner surface of the endless belt; said one rotatable member bending said upper run of the belt downwardly, thus forming a concavity in the belt, and comprising two coaxial discs arranged substantially at the opposite lateral edges of the belt; said two discs defining together with said concave portion of the band, a cavity or drageeing chamber in which said spraying and drying means are arranged; and the axis of rotation of one of said other rotatable members being movable between a first operative position or coating position and a second operative position or unloading position.

Each coating device may be provided with means of varying the drageeing angle.

The invention will be described by way of example with reference to the accompanying drawings in which:

FIG. 1 is a diagrammatic view of a drageeing apparatus comprising a number of coating devices, FIG. 2 is a side elevation of one coating device, FIG. 3 is a plan view of the coating device shown in FIG. 2, and FIG. 4 is a front elevation of the coating device shown in FIGS. 2 and 3.

In the drageeing apparatus shown in FIG. 1, a plurality of cores to be coated is fed through a funnel 10 onto a weighing belt 12 and thence over a conveyor belt 14 into a first coating device. Said coating device comprises a frame 30 which supports three rotatable members or drums 24, 26 and 28 round which an endless belt 20 is mounted.

Rotatable members 24, 26 and 28 are arranged in contact with the inner surface of belt 20 and members 22 and 26 are so arranged as to define an upper run and a lower run of the belt 20, while member 24 is arranged in contact with the inner surface of the lower run of the belt. A fourth rotatable member is arranged between members 22 and 26 and in contact with the outer surface of the upper run of belt 20. Said fourth rotatable member consists of two co-axial discs or saucers 28 which are arranged substantially at the opposite lateral edges of belt 20 and bend the upper run of belt 20 downwards thus forming a concave section 18 of the upper run of belt 20. Concave section 18 of belt 20 together with discs 28 define a cavity 16 which will be referred to below as coating or drageeing chamber.

Above drageeing chamber 16 there are fixed nozzles 34 for spraying and for supplying drying air.

Frame 38 is pivotally mounted at one side in bearings 32 the axis of which is parallel to the movement of belt 20. A hydraulic or pneumatic cylinder (not shown) is provided to tip frame 30 sideways in order to vary the drageeing angle, that is to say the angle at which a stream of sprayed coating suspension and/or drying air issuing from nozzles 34 impinges onto the cores to be coated on belt 20. It is sufficient to tip to the side in such a way that the axis of rotation of members 22-28 from an angle of up to 45° to the horizontal.

Whilst belt 20 runs in the direction of the arrows 36, the spraying and subsequent drying stages take place in drageeing chamber 16. When the sprayed layer has dried, member 22 is swung in the direction of the arrow 38 into the position 22' shown by the dashed lines in FIG. 1. For this purpose member 22 is mounted pivotally on a swinging arm or jib 40 which is mounted to swing about the axis of rotation of member 24. This swinging movement is brought about by a hydraulic cylinder 42. The two axes of rotation of the rotatable elements 22,24 are so arranged that in their coating position they lie approximately on a vertical plane and in their unloading position they lie approximately on a horizontal plane, an exactly horizontal alignment of said axes not being necessary since the dragees have sufficient adherence to belt 20 for them to be carried along even if belt 20 runs slightly upwards and to be fed over element 22 at the unloading point where they pass onto a steeply inclined, endless rotating conveyor belt 44 which carries the sprayed cores to a following coating device. This following coating device, which is shown in the bottom right position in FIG. 1, is identical with the coating device which has just been described. A second spraying stage takes place in this second coating device. After drying the sprayed cores are fed to a third coating device in the way described, a part of this being shown in FIG. 1 at the bottom on the left. The number of coating devices arranged in series depends on the number of layers to be sprayed onto the cores. At the end of the row of coating devices the finished dragees fall onto a conveyor belt, not shown in the drawing, which carries the dragees to a packing station.

The whole series of coating devices is mounted in a hermetically sealed housing 46 into which the cores are fed by the conveyor belt 14 through a suitable slit and from which they are removed at the other end of the housing through a corresponding slit by means of the conveyor belt already mentioned. Inside housing 46 the air conditions, in particular the air humidity and air temperature can be maintained exactly constant by means of suitable instrument. This makes a considerable contribution to the quality of the finished dragees. All the spraying nozzles and the drying air outlets 34 are connected to a central system which is shown by the dashed lines and denoted by 48 in FIG. 1.

The method in accordance with the invention for the production of finished dragees takes place with fully automated control. After the drying periods in all the drageeing chambers 16 has ended, a time control actuates all cylinders 42 simultaneously to swing arms 40 out of the vertical position into the approximately horizontal position, as a result of which rotatable element 22 is brought into the emptying position 22'. Since each belt 20 continues to run in the previous direction of rotation, the cores resting on said belt are carried very rapidly onto the adjacent conveyor belt 44. At this moment each cylinder 42 are again actuated to return the respective arms 40 to the vertical position. In each coating device this position is reached at least approximately by the time the first dragees fall from the following conveyor belt 44 onto the belt 20 of the following coating device. The transfer from one coating machine to the next can be made in a very short time. Once the cores have reached the next drageeing chamber 16, the frames 30 of the coating devices are swung to the side by the continuous drive and set at the correct drageeing angle. This drageeing angle can be different from device to device. But once the value has been set it must be kept constant. Next the spraying stage takes place simultaneously in all the coating devices, followed by the drying stage comprising blowing in cold and/or warm air and, if necessary, a further period without any air feed. This ends the work cycle and the time switch again actuates the control device for the cylinder 42 in order to "open" the drageeing chambers 16.

Thus a single component, that is to say belt 20, which during the spraying process forms the drageeing chamber, acts as conveyor during the unloading stage in order to discharge the sprayed cores.

One of the coating devices is shown in detail in FIGS. 2-4. Pivotally mounted on rocker bearings 32 on a base frame 50 is the frame 30 arranged to pivot at the lower end, the common axis of bearings 32 running horizontal and parallel to the direction of motion of belt 20. Acting on the frame 30 is an actuating member, not shown, which can be a pressure cylinder or a screw rod, the purpose of which is to swing the frame 30 to the side in a continuous motion up to a maximum of 45°. Swinging it in this way serves to adjust the drageeing angle. Rotatably mounted in the frame 30 by its two ends in bearings 54 (FIG. 3) is a through shaft 52. By means of pressure cylinders 56 the position of shaft 52 can be altered to control the tension of belt 20. Mounted on the shaft 52 are a number of spur and support discs 58 which serve to guide and deflect belt 20 and form rotatable element or drum 26.

Rotatably mounted on frame 30 there is another shaft 60 somewhat below and longitudinally apart from the shaft 52 in self-aligning ball bearings 62. The shaft 60 is likewise provided with spur and support discs 58 which deflect belt 20 and form rotatable element 24. Rotatably mounted on the shaft 60 is a fork 64 forming swinging arm 40. At the free ends of the arms of fork 64 if rotatably mounted a shaft 66, which again has spur and support discs 58 forming rotatable element or drum 22. The shaft 66 is driven through bevel gearing by a motor 68 which is fixed to one of the arms of fork 64.

Also mounted on the frame 30 at each side in a bearing 70 there is a hollow saucer 72 the saucers 72 corresponding to saucers 28 in FIG. 1. The axes of rotation 74 of the two saucers 72 are in alignment with one another. The mutual separation is slightly smaller than the width of belt 20 so that the edges of belt 20 are guided by the saucers 72. Saucers 72 define the drageeing chamber 16 shown in FIG. 1 together with the concave section 18 of belt 20. In the normal position the axis of rotation 74 of the saucers 72 lies horizontally (see FIG. 4). This is also the position in which said axis is set during the unloading stage of the coating device. To adjust the correct drageeing angle the frame 30 is — as described-tipped to the side into an inclined position by means of the pressure cylinder or mechanical screw spindle, not shown, the axis of rotation 74 of the saucers 72 then being set in a position shown at 74' in FIG. 4. Accordingly belt 20 is then in the position 20' shown by the dotted lines in FIG. 4.

By acting on fork 64, cylinder 42 swings fork 64 out of the vertical position shown by the full lines in FIG. 2 (drageeing or coating position) into the position 64' shown by the dashed lines (unloading position). The angle of swing is about 75°. The actual size of this angle is not of importance. Owing to the diameters of drums 22, 24 and 26 and discs 28 and arrangement of their axes, said angle of swing is such that belt 20 is kept tensioned.

The belt 20 is preferably made of metal, namely stainless steel, or carbon steel depending on the production medium, or possibly even of plastic. The belt 20 is driven by a spur strip 76 vulcanized onto the steel of the belt like a V belt profile which runs continuously on the inside of the conveyor belt. Plastic belts can be driven by a drum drive.

Motor 68 is preferably a hydraulic pressure oil motor which can be continuously regulated. Alternatively a continuously regulatable polyphase induction motor can be used or a polyphase induction motor with gears with a continuously variable transmission ratio.

In the embodiment of the invention shown in the Figures, each coating device has three rotatable members, namely members 22, 24 and 26, in contact with the inner surface of belt 20. However, by using members 22 and 26 of suitably larger diameter, it is possible to eliminate rotatable member 24.

The apparatus held in accordance with the invention in a hermetically sealed housing comprises a number of coating devices with conveyor belts in between and control and switching components for fully automated operation which are not shown. Each nozzle 34 and each belt 20 has an associated cleaning system, not shown, which comes into operation periodically to keep the coating devices in an operational state. It should also be mentioned that generally in the last coating device of the apparation the presence of a spraying system is optional since very often this device operates simply as a polishing device to smooth off the last dried covering layer and give it a neat surface.

What is claimed is:

1. Coating apparatus of dragees having oppositely arranged loading and unloading zones and comprising a support frame; three parallel rollers mounted on said frame; an endless belt being entrained about said rollers; a pair of axially spaced discs mounted on said frame and contacting the outer surface of the upper run of the endless belt at its lateral edges and bending said upper run of the belt downwardly, thus forming a drageeing chamber; driving means for moving said belt in one direction; said support frame being pivotally mounted on a base frame; said frame comprising a rocker arm movable in a plane perpendicular to the axis of rotation of said rollers, the rocker arm rotatably supporting one of said rollers at its free end and being operable to set and hold said roller in a first operative coating position and a second operative unloading position, the moving direction of the belt being the same in said two positions.

2. Apparatus as claimed in claim 1, said rocker arm being mounted for pivoting around the axis of rotation of one of said further rollers.

* * * * *